F. C. GROTENDICK.
SWINGING BUCK FOR VEHICLE BODIES.
APPLICATION FILED AUG. 14, 1918.
1,364,629. Patented Jan. 4, 1921.
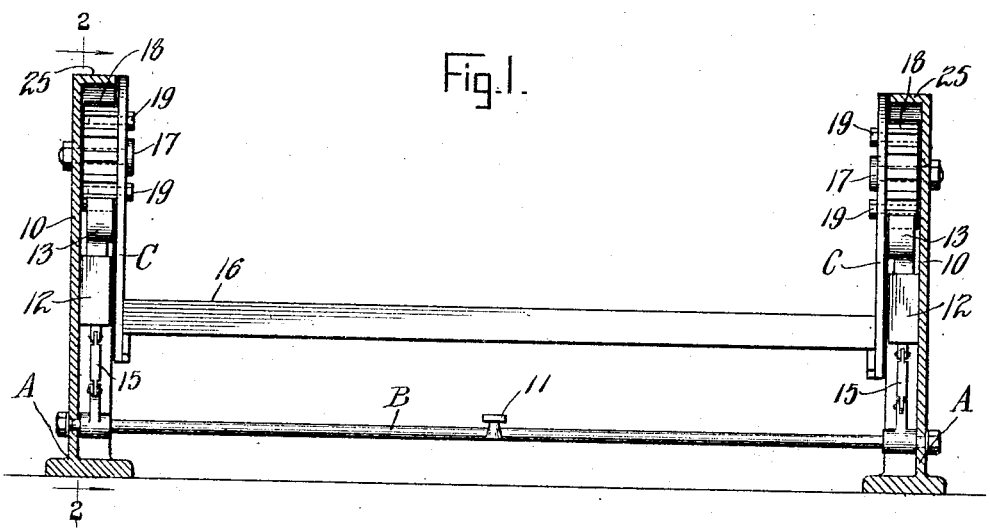
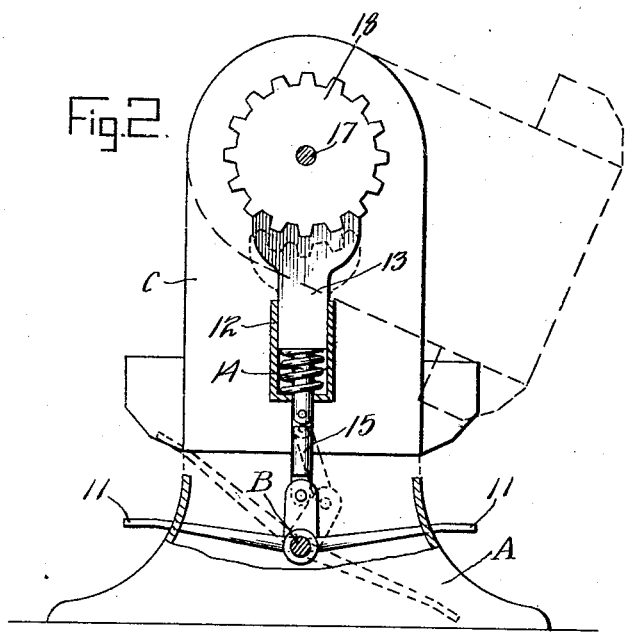
Inventor
Frederick C. Grotendick
By Bedford & Doolittle,
Attorneys

UNITED STATES PATENT OFFICE.

FREDERICK C. GROTENDICK, OF ROCK HILL, SOUTH CAROLINA.

SWINGING BUCK FOR VEHICLE-BODIES.

1,364,629.     Specification of Letters Patent.     Patented Jan. 4, 1921.

Application filed August 14, 1918. Serial No. 249,918.

*To all whom it may concern:*

Be it known that I, FREDERICK C. GROTENDICK, a citizen of the United States, residing at Rock Hill, York county, and State of South Carolina, have invented and discovered certain new and useful Improvements in Swinging Bucks for Vehicle-Bodies, of which the following is a specification.

The object of my said invention is to provide a swinging buck for convenience in handling vehicle bodies, such as automobile bodies, during the process of painting, soldering and such finishing work, all of which will be hereinafter more fully described and claimed.

Referring to the accompanying drawings which are made a part hereof and on which similar reference characters indicate similar parts, Figure 1 is a side elevation of a buck constructed in accordance with my said invention, and Fig. 2, a cross section through the same showing the parts in elevation.

In said drawings the portions marked A represent the ends of the base or frame, B a connecting member, and C the ends of the swinging frame or carrier.

The ends A are of metal, preferably of substantially the form shown, although any appropriate form may be used. They are of sufficient strength for the purpose and have upright supports 10 formed in piece therewith or secured thereon, said supports extending to a height sufficient to carry the swinging frame in the position desired, and have flanges 25 overhanging the ratchet mechanism. The connecting rod B connects the two ends A and also serves as a rock-shaft for operating the pawls which hold the swinging frame in adjusted position, as will be presently described. It is provided with foot levers 11 extending each way therefrom, centrally of its length, for convenience in operating said pawls. A housing 12 is secured on the inner face of each upright 10, having a sliding pawl 13 mounted therein, each of said pawls being normally held upward by a spring 14 and connected by a toggle 15 with the rock-shaft B on which the levers 11 are rigidly secured. Said pawls are preferably formed with segmental faces having several teeth, as shown.

The swinging frame comprises the ends C connected by a longitudinal bed 16 of any appropriate construction to support the vehicle body and is mounted by pivot bolts 17 on the uprights 10. Ratchet wheels 18 are rigidly secured to said ends C by bolts 19 and have teeth in their peripheries which are adapted to engage with the teeth on the upper end of the sliding pawls 13, the width of the faces of the pawls providing for the engagement of several teeth and a secure locking engagement between the parts.

In operation the vehicle body is mounted upon the longitudinal bed 16 and secured thereto by any appropriate means. The swinging frame is held in any position desired by the pawls 13 locking the ratchet wheels 18, which are rigid on said frame C, in whatever position desired. It will be seen that the operator by stepping upon either one of the levers 11 may unlock the swinging frame, when he can readily turn it on its pivots 17 to any new position to enable him to conveniently reach any part of the body, for working in the most convenient and advantageous manner. This swinging movement is not limited and may continue throughout the entire revolution if found advantageous.

Having thus fully described my said invention, what I claim as new and desire to secure by Letters Patent, is:—

1. A swinging buck for vehicle bodies comprising a pair of uprights, a shaft holding their lower ends fixedly in spaced relation, pivots at their upper ends, a cradle adjustable on the pivots, and holding the upper ends of the uprights fixedly in spaced relation, racks attached to the cradle, means acting on the racks to hold the cradle in adjusted position, and means on the shaft to control said holding means.

2. A swinging buck for supporting vehicle bodies for finishing operations and the like, comprising upright standards, a shaft connecting them at a relatively low point, a cradle for said bodies comprising a bottom portion normally positioned close to the shaft, hangers rigidly connected thereto and pivoted at their upper ends to the upper ends of the standards, annular toothed racks on the hangers between the hangers and the standards, pawls for engagement with the racks slidably mounted on the standards and means on the shaft for operating them simultaneously, the shaft with the cradle and its pivots adapted to constitute the sole support for said uprights.

In witness whereof, I have hereunto set my hand and seal at Rock Hill, South Carolina, this 10th day of August, A. D. nineteen hundred and eighteen.

FREDERICK C. GROTENDICK. [L. S.]

Witnesses:
W. E. RUTT,
JNO. R. SHURLEY.